US011875127B2

(12) United States Patent
Mahindru et al.

(10) Patent No.: US 11,875,127 B2
(45) Date of Patent: Jan. 16, 2024

(54) QUERY RESPONSE RELEVANCE DETERMINATION

(71) Applicant: International Business Machines Corporation, Armonk, NY (US)

(72) Inventors: Ruchi Mahindru, Elmsford, NY (US); Xin Zhou, Beijing (CN); Martin Franz, Yorktown Heights, NY (US); Sinem Guven Kaya, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 390 days.

(21) Appl. No.: 17/458,635

(22) Filed: Aug. 27, 2021

(65) Prior Publication Data
US 2023/0064961 A1 Mar. 2, 2023

(51) Int. Cl.
*G06F 40/35* (2020.01)
*G06F 16/335* (2019.01)
*G06F 16/33* (2019.01)

(52) U.S. Cl.
CPC ............ *G06F 40/35* (2020.01); *G06F 16/337* (2019.01); *G06F 16/3344* (2019.01)

(58) Field of Classification Search
CPC ..... G06F 40/35; G06F 16/337; G06F 16/3344
See application file for complete search history.

(56) References Cited

U.S. PATENT DOCUMENTS

| 6,085,186 | A | * | 7/2000 | Christianson | ....... G06F 16/9538 |
| | | | | | 707/999.005 |
| 8,020,104 | B2 | | 9/2011 | Robarts | |
| 9,836,177 | B2 | | 12/2017 | Brown | |
| 10,241,567 | B2 | | 3/2019 | Gopalakrishnan | |
| 10,515,632 | B2 | | 12/2019 | Gilbert | |
| 10,579,658 | B2 | | 3/2020 | Freilinger | |
| 10,838,801 | B2 | | 11/2020 | Rau | |
| 10,877,784 | B1 | | 12/2020 | Testuggine | |

(Continued)

OTHER PUBLICATIONS

Dalip et al., "Exploiting User Feedback to Learn to Rank Answers in Q&A Forums: a Case Study with Stack Overflow", SIGIR'13, Jul. 28-Aug. 1, 2013, Dublin, Ireland, ACM 978-1-4503-2034-Apr. 13,20 07, 10 pages.

(Continued)

*Primary Examiner* — Ibrahim Siddo
(74) *Attorney, Agent, or Firm* — Stephen R. Yoder (57) ABSTRACT

A method for estimating response relevance with respect to a received query includes receiving a set of user feedback items, a set of historical feedback data, and a set of context data, creating a user profile model according to the set of historical feedback data, wherein the user profile model indicates a weighting attribute based on the set of historical feedback data, weighting the set of user feedback items according to the created user profile model, creating a response relevance estimation model based on the weighted set of user feedback items, the received set of context data, and the received set of historical feedback data, and ranking one or more responses according to the created response relevance estimation model. The method may further include adjusting the user profile model and the response relevance estimation model responsive to receiving additional data.

20 Claims, 5 Drawing Sheets

(56) References Cited

U.S. PATENT DOCUMENTS

| | | | |
|---|---|---|---|
| 2011/0004588 A1 | 1/2011 | Leitersdorf | |
| 2011/0106630 A1 | 5/2011 | Hegeman | |
| 2011/0313834 A1* | 12/2011 | Jain | G06Q 30/0214 |
| | | | 705/14.69 |
| 2014/0164476 A1 | 6/2014 | Thomson | |
| 2018/0365026 A1 | 12/2018 | Jernigan | |
| 2020/0285327 A1 | 9/2020 | Hindi | |
| 2020/0394366 A1 | 12/2020 | Miller | |
| 2020/0395007 A1 | 12/2020 | Cheng | |
| 2021/0004414 A1 | 1/2021 | Silverstein | |

OTHER PUBLICATIONS

Li, Hang, "A Short Introduction to Learning to Rank", IEICE Trans. Inf. & Syst., vol. E94-D, No. Oct. 10, 2011, PAPER Special Section on Information-Based Induction Sciences and Machine Learning, 9 pages.

Massai et al., "PAVAL: A Location-Aware Virtual Personal Assistant For Retrieving Geolocation Points Of Interest And Location-Based Services", Engineering Applications of Artificial Intelligence 77 (2019) 70-85, ELSEVIER, 16 pages.

Rafailidis et al., "The Technological Gap Between Virtual Assistants And Recommendation Systems", arXiv:1901.00431v2 [cs.IR] Jan. 6, 2019, 6 pages.

Semeraro et al., "User Profiling And Virtual Agents: A Case Study On E-Commerce Services", Univ Access Inf Soc, Long Paper, © Springer-Verlag 2008, 16 pages.

Silva-Coira et al., "Intelligent Virtual Assistant for Gamified Environments", Association for Information Systems AIS Electronic Library (AISeL), PACIS 2016 Proceedings Pacific Asia Conference on Information Systems(PACIS), 9 pages.

Viros et al., "From Design Assistants To Design Peers : Turning Daphne Into An AI Companion For Mission Designers", Texas A&M University, College Station, Texas, printed on Feb. 19, 2021, 12 pages.

Zamani et al., "Situational Context for Ranking in Personal Search", WWW 2017, Apr. 3-7, 2017, Perth, Australia, ACM 978-1-4503-4913-0/17/04, 10 pages.

* cited by examiner

QUERY RESPONSE RELEVANCE DETERMINATION

BACKGROUND

The present invention relates generally to the field of virtual assistance, and more specifically, to estimating query response relevance according to user feedback.

The IT field is seeing increased prevalence of virtual assistants (VAs) or virtual agents for support staff. In general, virtual assistants (also referred to as virtual agents, intelligent virtual assistants (IVAs), or intelligent personal assistants (IPAs)) are software agents that can perform tasks or services for an individual based on commands or questions. With respect to virtual assistants generally accessed by online chat, the term "chatbot" may also be used. Some virtual assistants are able to interpret human speech and respond via text or via synthesized voices. Users can ask virtual assistants questions, control home automation devices and media playback via voice, and manage other basic tasks such as email, to-do lists, and calendar events with verbal commands and prompts. Virtual assistants may commonly be configured to find relevant responses to received user queries.

SUMMARY

As disclosed herein, a computer implemented method for estimating response relevance with respect to a received query includes receiving a set of user feedback items, a set of historical feedback data, and a set of context data, creating a user profile model according to the set of historical feedback data, wherein the user profile model indicates a weighting attribute based on the set of historical feedback data, weighting the set of user feedback items according to the created user profile model, creating a response relevance estimation model based on the weighted set of user feedback items, the received set of context data, and the received set of historical feedback data, and ranking one or more responses according to the created response relevance estimation model. The method may further include adjusting the user profile model and the response relevance estimation model responsive to receiving additional data.

DETAILED DESCRIPTION

When a virtual assistant is deployed, there is often no usage log data available to enable learning based on runtime data. Artificial intelligence (AI) model training requires a large amount of quality data, and it therefore may take a while for an effective feedback learning method to be trained and implemented. Additionally, IT support agents have different skills and expertise, and everyone's feedback may not be equivalent. Typically, systems are deployed and data is collected, and it may become apparent much later that usage data is not good quality (may be biased, skewed, etc.). Embodiments of the present invention enable a system which adjusts itself between an initial deployment and a steady state phase to estimate response relevance.

As used herein, the initial deployment phase refers to a rule-based deployment phase in which the system estimates response relevance based on context and business policy. In general, the initial deployment phase typically requires minimal agent feedback data, and may additionally include collecting training data to train and develop an AI model for re-ranking response relevance results. Once a steady state phase is established, or once more quality data becomes available, the system enters a deep learning model phase in which the AI model is continuously re-trained according to the newly available data to estimate response relevance. The deep learning model phase may additionally include collecting and analyzing feedback for quality data collection and model training. In the initial deployment phase, the system may be static in the sense that the system provides output according to a set of rules. In said initial deployment phase, the system uses context and business policy as a basis for a decision. Once a threshold amount of data has been received, identified, or analyzed, the system may establish a steady state phase, in which the system uses an AI model (or a statistical model) which is continuously updated based on data from the system's interaction with the user. In at least some embodiments, the steady state phase may also be referred to as a runtime phase, wherein the system begins to be utilized and collect data. In other words, the deployment phase corresponds to an initialization phase in which significant runtime usage data may not be available for fine-tuning the decision-making models as described herein. In at least some embodiments, establishing a steady state phase may include training transformer based deep-learning models according to received runtime usage data.

Figure 1:
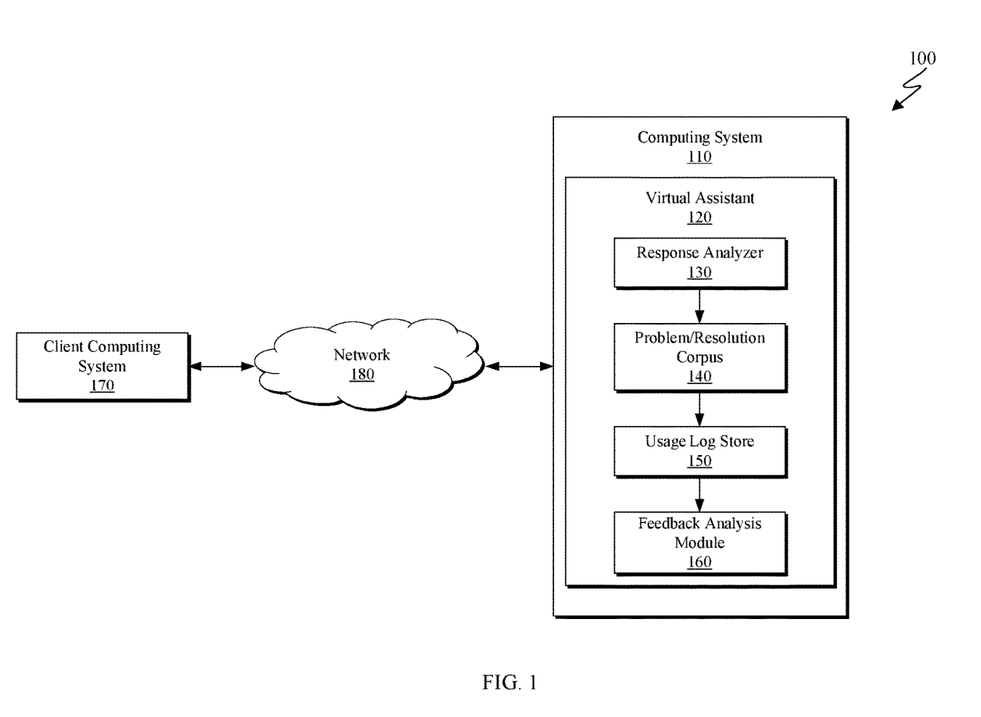
FIG. 1 is a block diagram depicting a response relevance estimation system in accordance with at least one embodiment of the present invention.

FIG. 1 is a block diagram depicting a response relevance estimation system 100 in accordance with at least one embodiment of the present invention. As depicted, response relevance estimation system 100 includes computing system 110, client computing system 170, and network 180. In general, response relevance estimation system 100 is configured to analyze and estimate response relevance with respect to queries posed to a virtual assistant.

Computing system 110 can be a desktop computer, a laptop computer, a specialized computer server, or any other computer system known in the art. In some embodiments, computing system 110 represents computer systems utilizing clustered computers to act as a single pool of seamless resources. In general, computing system 110 is representative of any electronic device, or combination of electronic devices, capable of receiving and transmitting data, as described in greater detail with regard to FIG. 4. Computing system 110 may include internal and external hardware components, as depicted and described in further detail with respect to FIG. 4.

Similarly, client computing system 170 can be a desktop computer, a laptop computer, a specialized computer server, or any other computer system known in the art. In some embodiments, computing system 170 represents computer systems utilizing clustered computers to act as a single pool of seamless resources. In general, computing system 170 is representative of any electronic device, or combination of electronic devices, capable of receiving and transmitting data, as described in greater detail with regard to FIG. 4. Computing system 110 may include internal and external hardware components, as depicted and described in further detail with respect to FIG. 4. As depicted, client computing system may be in communication with computing system 110 via network 180. In at least some embodiments, client computing system 170 is configured to provide a user query to virtual assistant 120. Client computing system 170 may additionally be configured to receive an answer or response to the user query from virtual assistant 120. In at least some embodiments, client computing system 170 is configured to provide feedback to virtual assistant 120 regarding the received answer or response to the user query. Client computing system 170 may include a user interface configured to enable a user to provide any of said user query and said feedback.

Network 180 can be, for example, a local area network (LAN), a wide area network (WAN) such as the Internet, or a combination of the two, and include wired, wireless, or fiber optics connections. In general, network 180 can be any combination of connections and protocols that will support communications between computing system 110 and client computing system 170.

As depicted, computing system 110 includes virtual assistant 120. Virtual assistant 120 may correspond to any virtual agent configured to provide IT support and generally respond to IT queries issued by users. As depicted, virtual assistant 120 includes response analyzer 130, problem/resolution corpus 140, usage log store 150, and feedback analysis module 160.

Response analyzer 130 may be configured to receive and process a user query. In at least some embodiments, response analyzer 130 is configured to encode the received user query and provide said query to problem/resolution corpus 140. Problem/resolution corpus 140 may be configured to compare the received user query to one or more available query/resolution pairs previously received or otherwise available. In general, problem/resolution corpus 140 may be configured to store a plurality of query/resolution pairs, and subsequently execute semantic comparisons between received user queries and queries stored relative to said plurality of query/resolution pairs. Usage log store 150 may generally be a data store through which usage log data corresponding to query/resolution pairs deemed semantically similar to the received user query. In general, usage log store 150 may be configured to store data corresponding to received user queries or known query/resolution pairs, and can be representative of one or more databases that give permissioned access to computing system 110 or publicly available databases. In general, usage log store 150 can be implemented using any non-volatile storage media known in the art. For example, usage log store 150 can be implemented with a tape library, optical library, one or more independent hard disk drives, or multiple hard disk drives in a redundant array of independent disk (RAID).

Feedback analysis module 160 may be configured to receive and process user profile data, historical log data, known query resolution data, and operational policy data to provide weighted user feedback according to the received data. An embodiment of an appropriate analysis module is described in further detail with respect to FIG. 3A and FIG. 3B.

Figure 2:
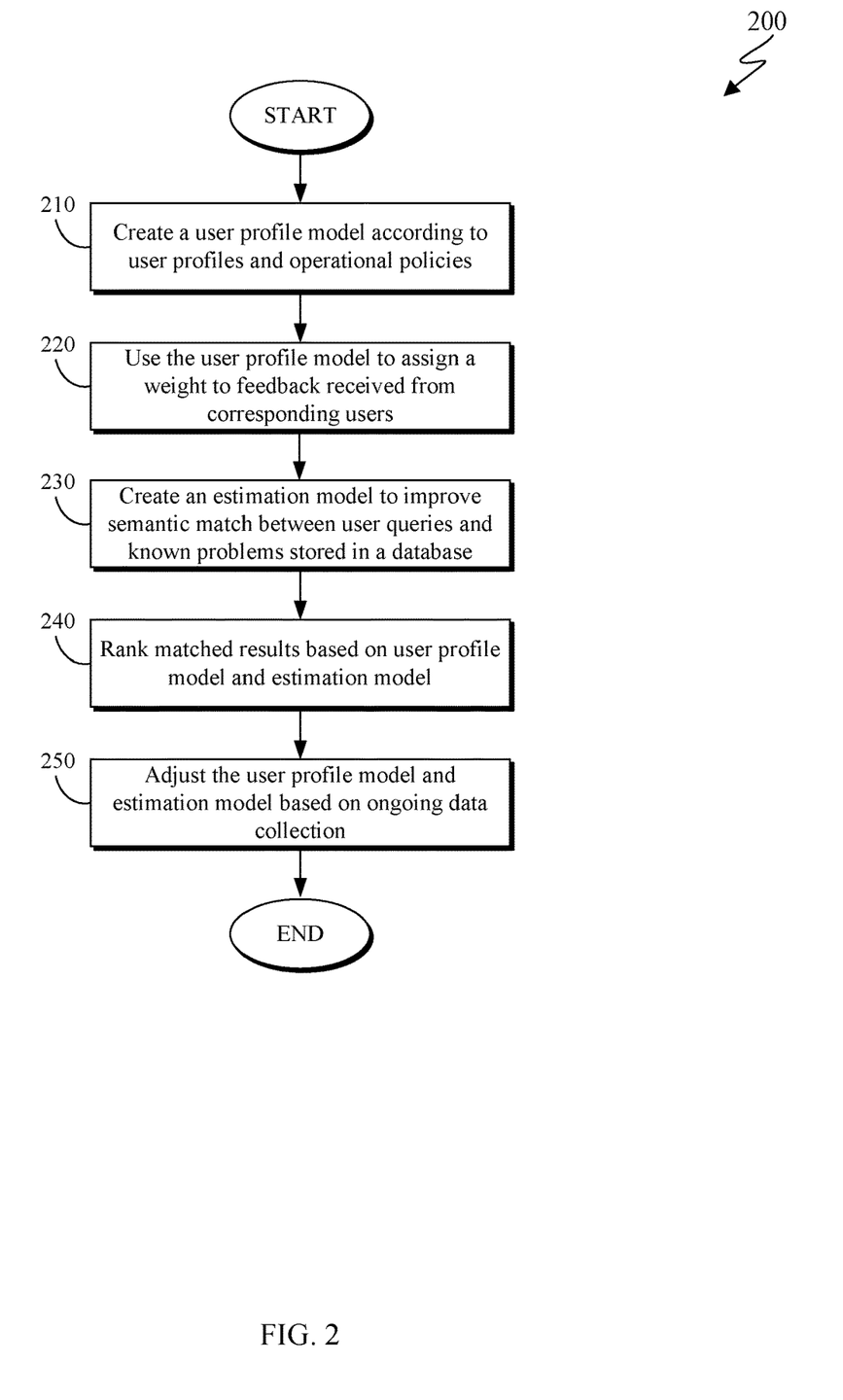
FIG. 2 is a flowchart depicting a response relevance estimation method in accordance with at least one embodiment of the present invention.

FIG. 2 is a flowchart depicting a response relevance estimation method 200 in accordance with at least one embodiment of the present invention. As depicted, response relevance estimation method 200 includes creating (210) a user profile model according to user profiles and operational policies, using (220) the user profile model to assign weight to feedback received from corresponding users, creating (230) an estimation model to improve semantic match between user queries and known problems stored in a database, ranking (240) matched results based on the user profile model and the estimation model, and adjusting (250) the user profile model and estimation model based on ongoing data collection. In general, response relevance estimation method 200 may be executed by a computing system, such as computing system 110, a virtual assistant, such as virtual assistant 120, or any number of modules or applications hosted upon such a computer system or virtual assistant.

Creating (210) a user profile model according to user profiles and operational policies may include collecting available user profiles, operational policies, historical logs, and other available context information to construct a user profile model. In at least some embodiments, each user profile includes instances of feedback as provided by a corresponding user. In other embodiments, each profile instead includes a representation of the feedback as provided by the user; in other words, rather than including the feedback itself, the profile may include a summary representation or analysis of the feedback the user has provided. For example, the user profile may include a shortened version of the feedback provided by the user, such as a rating or an indication of whether the feedback was generally positive or generally negative, etc. The user profile may additionally include additional identifying details for the user; for example, the user profile may be tagged with a platform via which the user typically provides their feedback, such that the feedback may be categorized and directed accordingly. The user profile may additionally include details such as user experience level and individual familiarity with the virtual assistant. In some embodiments, the user profile additionally includes details such as which domain or domains the user is familiar with. Operational policy may correspond to any means of operational protocols or otherwise which may indicate a higher prioritization of certain feedback relative to other feedback. For example, in an environment where a virtual assistant primarily supports a first department, but feedback is received from many departments, operational policy may indicate that feedback from the members of the first department should be attributed a greatest weight, etc. Creating (210) a user profile model may additionally include incorporating historical logs and other available context information in a similar fashion; in embodiments wherein either historical data or additional context information is available that would indicate prioritization of some feedback over other feedback, creating (210) a user profile model includes reflecting said variables within the model. For example, in an embodiment wherein historical data indicates that a first user frequently issues contradictory feedback with respect to other users, creating (210) a user profile model may include weighting a variable associated with said first user's feedback such that said variable is weighted less than other users given the penchant for being misaligned with a consensus opinion. In yet additional embodiments, creating (210) a user profile model includes creating a model which aggregates available user profiles, operational policies, historical logs, and other available context information with respect to a feedback item or response to determine, based on the aforementioned available data, how heavily said feedback item will be weighted when determining an aggregation of corresponding feedback items. In general, creating (210) a user profile model includes generating a mechanism or means for weighting feedback received from users represented by the data used to create the model.

Using (220) the user profile model to assign weight to feedback received from corresponding users may include identifying a received feedback item corresponding to one or more users represented by the user profile model. Using (220) the user profile model may additionally include identifying variables corresponding to the received feedback item, such as a corresponding user profile, operational policy, historical log, or context information, and determining an appropriate weighting for the received feedback item according to the user profile model. In embodiments wherein the user profile model corresponds to a mathematical model indicating a means for manipulating and combining said available variables, using (220) the user profile model includes inserting the pertinent variable values or conditions into the appropriate positions in the model and calculating weight for the feedback item accordingly. In at least some embodiments, using (220) the user profile model to assign weight to feedback includes assigning weight with respect to a received query of interest.

Creating (230) an estimation model to improve semantic match between user queries and known problems stored in a database may include analyzing available data to determine a correlation model between said data and response relevance. In general, creating (230) an estimation model includes determining a function or model for mapping a correlation between available data such as historical logs, context data, known query and response pairs, and operational policies and response relevance. One example of estimation model creation is described in detail with respect to FIG. 3A and FIG. 3B. Creating (230) an estimation model may include creating an estimation model specific to a current application domain. In some embodiments, creating (230) an estimation model includes configuring the estimation model for use with new application domains by using model adaptation techniques known in the art. In general, any classification algorithm can be applied to create (230) an estimation model to improve semantic match; examples include, but are not limited to, artificial neural networks, maximum entropy models, support vector machines, and decision trees.

Ranking (240) matched results based on the user profile model and the estimation model may include using the estimation model to determine response relevance corresponding to a response of interest. In at least some embodiments, ranking (240) matched results based on the user profile model and the estimation model includes adjusting existing ranks for the matched results according to analysis as determined by the estimation model. In general, ranking (240) matched results based on the user profile model and the estimation model includes ranking responses according to the estimation model. Ranking (240) matched results based on the user profile model and the estimation model may include identifying one or more top results to the query of interest according to the estimation model results. In at least some embodiments, ranking (240) matched results includes recommending a top result to the query of interest accordingly.

Adjusting (250) the user profile model and estimation model based on ongoing data collection may include receiving or requesting additional pertinent data with respect to the user profile model and the estimation model in an ongoing fashion; in other words, adjusting (250) the user profile model and estimation model based on ongoing data collection includes updating each model as necessary when new or updated data is available to keep the models current. In at least some embodiments, adjusting (250) the user profile model and estimation model based on ongoing data collection includes executing the preceding steps of the method repeatedly as new or updated data is made available. Adjusting (250) the user profile model and estimation model generally includes altering variables and coefficients in either the user profile model and estimation model to appropriately reflect changes in user profile data, context data, operational policy data, or historical log data.

Figure 3A:
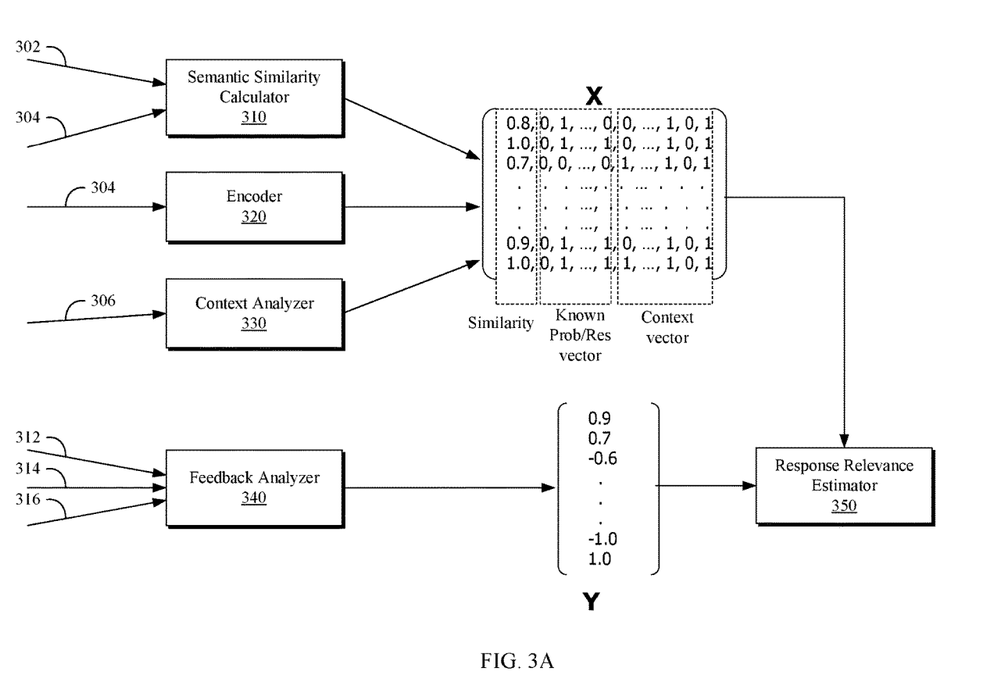
FIG. 3A is a flow diagram depicting an estimation model training operation in accordance with at least one embodiment of the present invention.

FIG. 3A is a flow diagram depicting an estimation model's training in accordance with at least one embodiment of the present invention. The flow diagram depicts a plurality of data items being fed through various analysis modules in order to determine a correlation between a historical data matrix, depicted as X, and a response matrix, depicted as Y. As depicted, a semantic similarity calculator 310 is configured to receive and process a user query 302 and a set of matched known query and resolution data 304. Semantic similarity calculator 310 may be configured to determine a level of similarity between the user query 302 and one or more queries of the set of matched known query and resolution data 304. In at least some embodiments, semantic similarity calculator 310 is configured to conduct natural language analysis to determine a level of similarity between the one or more queries of the set of matched known query and resolution data 304 and the received user query 302. Semantic similarity calculator 310 may be configured to assign a similarity score to each of these pairings. Encoder 320 is configured to receive and encode the set of matched known query and resolution data 304 to maintain security and privacy with respect to the data. Context analyzer 330 is configured to receive context data 306 and build a vector comprising values corresponding to one or more contextual features corresponding to each subject known problem and resolution pairing. As depicted, semantic similarity calculator 310, encoder 320, and context analyzer 330 combine results to provide the historical data matrix X, in which each row corresponds to a single known query and resolution pairing. In general, context as it is used herein can be based on the properties of the user, such as domain expertise, as well as a history of interaction of the user within the system. Additionally, context may be related to the system that is the subject of interaction between a user and the subject virtual assistant. For example, context as used here may indicate whether the system is a laptop, desktop, storage, network system, specific brand or model of a device, or a specific operation system; in general, the context may indicate defining details regarding the system with which a user is interacting. In some embodiments, a query type as posed by the user may additionally be considered contextual detail. Context data 306 may include any data provided corresponding to any of the described contexts, or any other details surrounding the user or system which may be considered contextual.

Feedback analyzer 340 is configured to receive a user profile 312, user feedback 314, and operational policy 316. User profile 312 may include identifying details for the user; for example, the user profile may be tagged with a platform via which the user typically provides their feedback, such that the feedback may be categorized and directed accordingly. User profile 312 may additionally include details such as user experience level and individual familiarity with the virtual assistant. In some embodiments, user profile 312 additionally includes details such as which domain or domains the user is familiar with. User feedback 314 may include feedback data as provided by the user. Alternatively, user feedback 314 may correspond to a representation of feedback provided by the user, rather than the feedback itself; for example, user feedback 314 may correspond to a shortened version of feedback provided by the user, or simply a rating representative of the feedback. Operational policy 316 may correspond to any means of operational protocols or otherwise which may indicate a higher prioritization of certain feedback relative to other feedback. For example, in an environment where a virtual assistant primarily supports a first department, but feedback is received from many departments, operational policy may indicate that feedback from the members of the first department should be attributed a greatest weight, etc. Feedback analyzer 340 is configured to process and analyze user profile 312, user feedback 314, and operational policy 316 to generate a response matrix, depicted as Y, indicating response relevance according to the received data.

Response relevance estimator 350 is configured to process historical data matrix X and response matrix Y to determine a correspondence between the two matrices. Generally speaking, response relevance estimator 350 is configured to model the relationship between historical data matrix X and response matrix Y to be implemented in cases where only some data is available.

Figure 3B:
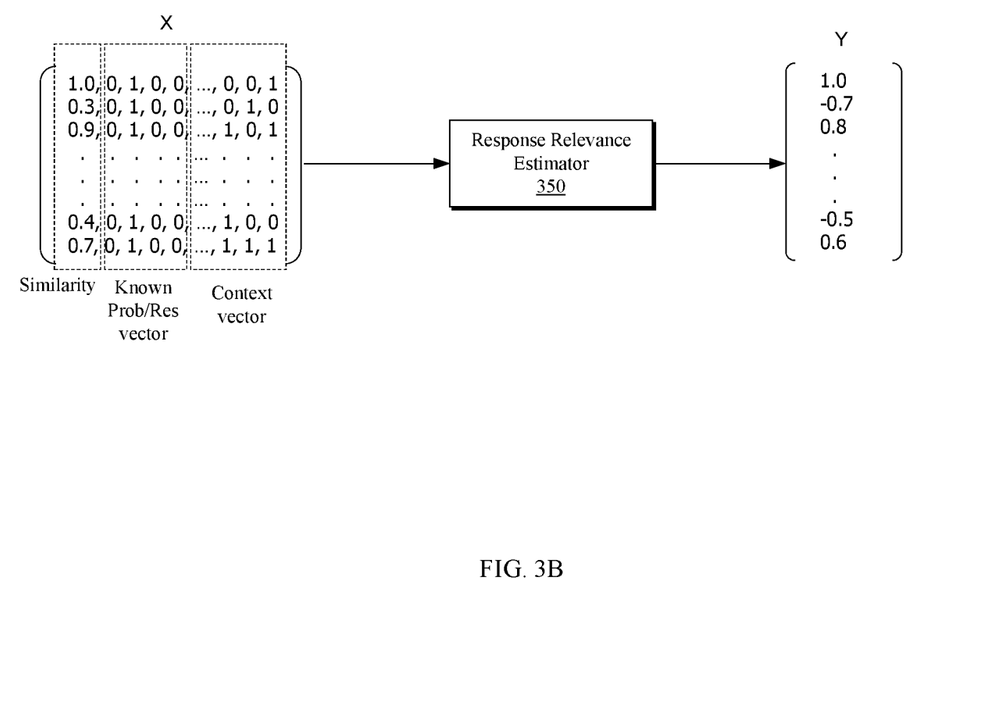
FIG. 3B is a flow model depicting runtime utilization of an estimation model in accordance with at least one embodiment of the present invention.

FIG. 3B is a flow model depicting runtime utilization of an estimation model in accordance with at least one embodiment of the present invention. As depicted, response relevance estimator 350 is configured to receive and process a historical data matrix X. Historical data matrix X is constructed based on output from various modules as described with respect to FIG. 3A, such as semantic similarity calculator 310, encoder 320, and context analyzer 330. With respect to the depicted embodiment, response relevance estimator 350 utilizes the estimation function as determined during the training stage to calculate a response relevance matrix Y according to the historical data matrix X. With respect to each matrix, each row corresponds to an individual query/resolution pairing.

Figure 4:
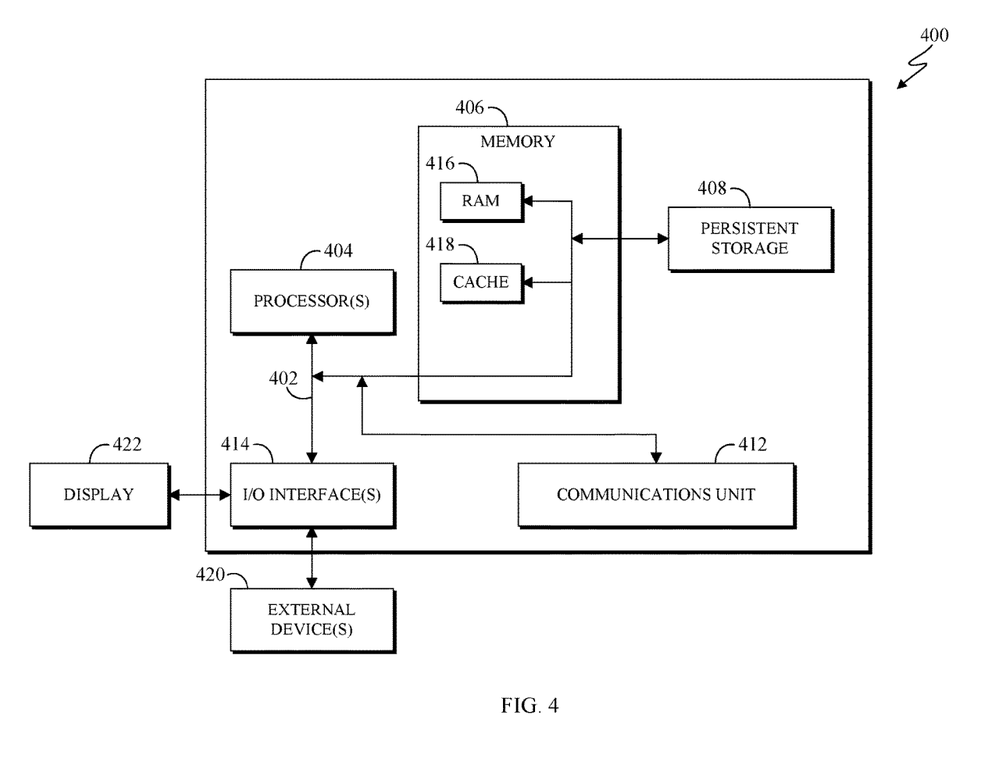
FIG. 4 is a block diagram of components of a computing system in accordance with an embodiment of the present invention.

FIG. 4 depicts a block diagram of components of computing system 110 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications, and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media.

One or more programs may be stored in persistent storage 408 for access and/or execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 414. I/O interface(s) 414 also connect to a display 422.

Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for estimating response relevance with respect to a received query, the computer implemented method comprising:
receiving a set of user feedback items, a set of historical feedback data, and a set of context data corresponding to a system configured to respond to user input;
creating a user profile model according to the set of historical feedback data, wherein the user profile model indicates a weighting attribute based, at least in part, on the set of historical feedback data;
weighting the set of user feedback items according to the created user profile model;
creating a response relevance estimation model based, at least in part, on the weighted set of user feedback items, the received set of context data, and the received set of historical feedback data, wherein the response relevance estimation model estimates a response's relevance to the received query; and
ranking one or more responses according to the created response relevance estimation model.

2. The computer implemented method of claim 1, further comprising adjusting the user profile model and the response relevance estimation model based, at least in part, on receiving additional data.

3. The computer implemented method of claim 1, wherein the set of context data includes operational policy data.

4. The computer implemented method of claim 1, wherein the set of historical feedback data includes previous feedback tendencies with respect to one or more users.

5. The computer implemented method of claim 1, further comprising recommending one of the one or more responses according to the ranking.

6. The computer implemented method of claim 1, further comprising configuring the response relevance estimation model for one or more application domains.

7. The computer implemented method of claim 6, further comprising creating one or more response relevance estimation models for one or more new application domains using model adaptation techniques.

8. A computer program product for estimating response relevance with respect to a received query, the computer program product comprising:
one or more computer readable storage media and program instructions stored on the one or more computer readable storage media, the program instructions comprising instructions to:
receive a set of user feedback items, a set of historical feedback data, and a set of context data corresponding to a system configured to respond to user input;
create a user profile model according to the set of historical feedback data, wherein the user profile model indicates a weighting attribute based, at least in part, on the set of historical feedback data;
weight the set of user feedback items according to the created user profile model;
create a response relevance estimation model based, at least in part, on the weighted set of user feedback items, the received set of context data, and the received set of historical feedback data, wherein the response relevance estimation model estimates a response's relevance to the received query; and
rank one or more responses according to the created response relevance estimation model.

9. The computer program product of claim 8, the program instructions further comprising instructions to adjust the user profile model and the response relevance estimation model based, at least in part, on receiving additional data.

10. The computer program product of claim 8, wherein the set of context data includes operational policy data.

11. The computer program product of claim 8, wherein the set of historical feedback data includes previous feedback tendencies with respect to one or more users.

12. The computer program product of claim 8, the program instructions further comprising instructions to recommend one of the one or more responses according to the ranking.

13. The computer program product of claim 8, the program instructions further comprising instructions to configure the response relevance estimation model for one or more application domains.

14. The computer program product of claim 13, the program instructions further comprising instructions to create one or more response relevance estimation models for one or more new application domains using model adaptation techniques.

15. A computer system for estimating response relevance with respect to a received query, the computer system comprising:
one or more computer processors;
one or more computer-readable storage media;
program instructions stored on the computer-readable storage media for execution by at least one of the one or more processors, the program instructions comprising instructions to:
receive a set of user feedback items, a set of historical feedback data, and a set of context data corresponding to a system configured to respond to user input;
create a user profile model according to the set of historical feedback data, wherein the user profile model indicates a weighting attribute based, at least in part, on the set of historical feedback data;
weight the set of user feedback items according to the created user profile model;
create a response relevance estimation model based, at least in part, on the weighted set of user feedback items, the received set of context data, and the received set of historical feedback data, wherein the response relevance estimation model estimates a response's relevance to the received query; and
rank one or more responses according to the created response relevance estimation model.

16. The computer system of claim 15, the program instructions further comprising instructions to adjust the user profile model and the response relevance estimation model based, at least in part, on receiving additional data.

17. The computer system of claim 15, wherein the set of context data includes operational policy data.

18. The computer system of claim 15, the program instructions further comprising instructions to recommend one of the one or more responses according to the ranking.

19. The computer system of claim 15, the program instructions further comprising instructions to configure the response relevance estimation model for one or more application domains.

20. The computer system of claim 19, the program instructions further comprising instructions to create one or more response relevance estimation models for one or more new application domains using model adaptation techniques.

* * * * *